United States Patent [19]

Johnson et al.

[11] 3,975,744

[45] Aug. 17, 1976

[54] AUTOMATIC EXPOSURE CONTROL SYSTEM

[75] Inventors: Bruce K. Johnson, Andover; George D. Whiteside, Lexington, both of Mass.

[73] Assignee: Polaroid Corporation, Cambridge, Mass.

[22] Filed: Jan. 2, 1975

[21] Appl. No.: 538,108

Related U.S. Application Data

[63] Continuation-in-part of Ser. No. 494,994, Aug. 5, 1974, Pat. No. 3,896,458, which is a continuation of Ser. No. 376,513, July 5, 1973, abandoned.

[52] U.S. Cl. .................................. 354/29; 354/59; 354/196
[51] Int. Cl.² .......................................... G03B 7/14
[58] Field of Search ................. 354/30, 29, 59, 196, 354/230

[56] References Cited
UNITED STATES PATENTS
3,832,722  8/1974  Douglas ............................ 354/30 X

*Primary Examiner*—L. T. Hix
*Assistant Examiner*—James LaBarre
*Attorney, Agent, or Firm*—David R. Thornton

[57] ABSTRACT

A photographic exposure control system which automatically functions in an ambient mode of operation, in response to scene light values and in a flash mode of operation, in response to both scene light values and scene ranging, the latter providing select aperture values in accordance with anticipated flash illumination of the scene, includes a trim mechanism providing operator variation of the automatic settings for both the ambient and flash modes of operation. The trim arrangement provides a single control which alters both the photoresponse of the system and the selection of aperture with scene ranging so as to modify only the photoresponse for ambient operation and both the photoresponse and the scene ranging response for the flash illumination mode.

13 Claims, 5 Drawing Figures

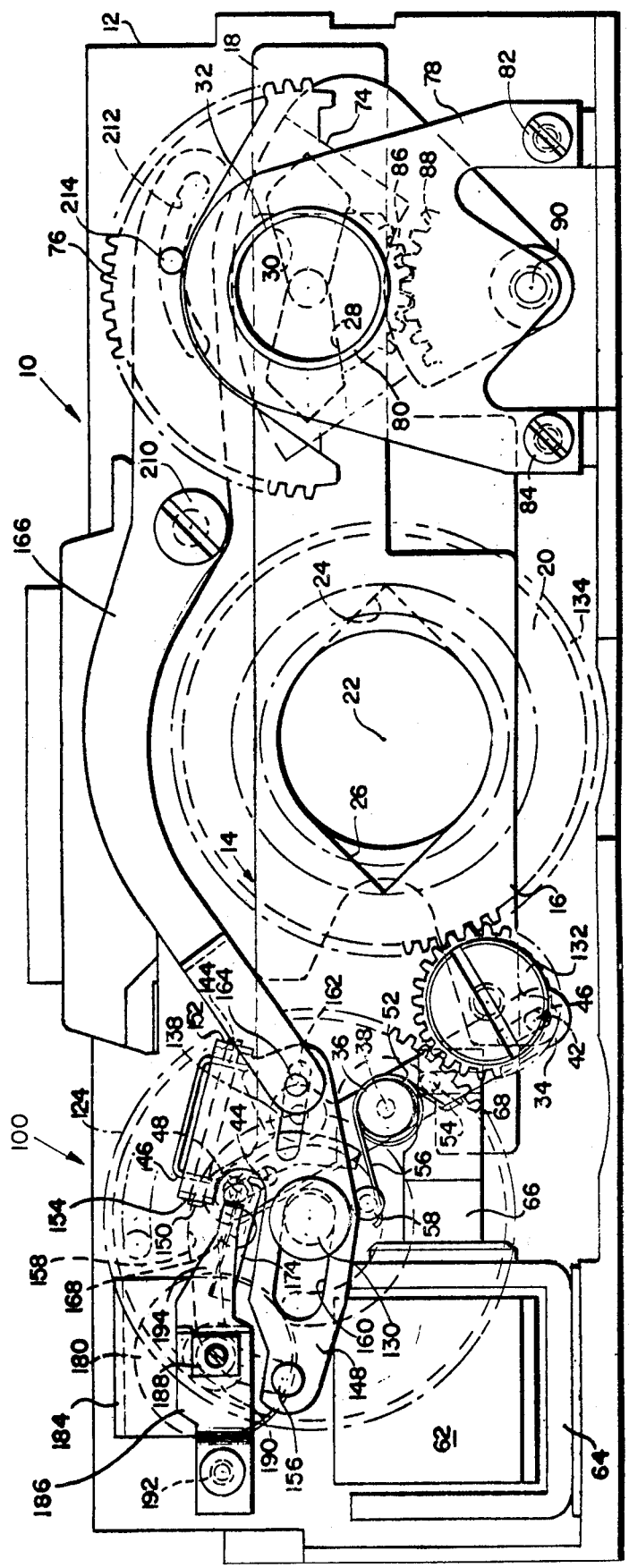
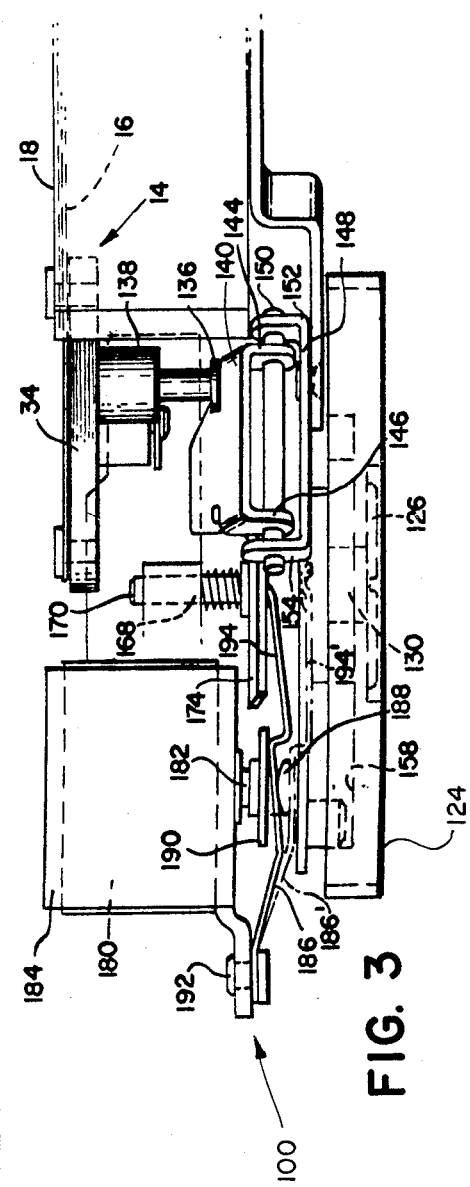
FIG. 1
FIG. 3

AUTOMATIC EXPOSURE CONTROL SYSTEM

CROSS REFERENCE TO RELATED APPLICATIONS

This application is a continuation-in-part of U.S. application Ser. No. 494,994 filed Aug. 5, 1974, now U.S. Pat. No. 3,896,458 issued July 22, 1975 which is a continuation of U.S. application Ser No. 376,513 filed July 5, 1973, now abandoned.

BACKGROUND OF THE INVENTION

This invention relates to photographic exposure control systems and, more particularly, to an exposure control system having automatic control in both ambient and flash modes of operation.

The above-noted parent application describes a so-called "hybrid" exposure control system which is responsive solely to scene brightness in an ambient mode of operation and to both scene brightness and scene ranging in a transient, or that is, a flash illumination mode. In the above system, shutter-diaphragm blades are driven from a closed position toward enlarging aperture values and back to a closed position to define both a maximum aperture and an exposure interval. In a flash mode of operation, the maximum aperture is determined from scene ranging, or that is, in accordance with the anticipated level of flash illumination of the scene while the exposure interval is responsive to scene brightness whereas in the ambient mode, both the maximum aperture and the exposure interval are determined by scene brightness. Consequently, while the responsiveness to scene brightness is solely controlling in the ambient mode, it shares control with the subject distance selection under flash operation. Another example of a hybrid exposure control system is also described in U.S. Pat. No. 3,464,332 issued to Davidson et. al. on Sept. 2, 1969.

While the above systems provide a fully automatic camera operation, it is often desirable to provide a trim function to accomodate for slight variation in film characteristics as well as to insert operator control over the fully automated system. Further, it is desirable to provide a trim arrangement with only one manually adjustable control component. In more conventional exposure control systems which employ different control elements respectively in each of the two modes of operation, the provision of a trim control is known and is shown, for example, in U.S. Pat. No. 3,832,722 issued to Lawrence M. Douglas on Aug. 27, 1974.

For a hybrid system such as described in the parent application, however, the provision of efficient trim arrangement operable in both the ambient and flash modes of operation is complicated by the fact that the scene brightness sensing means is utilized in both modes of operation while scene ranging is operable solely in the artificial illumination mode.

Consequently, it is an important object of this invention to provide an improved hybrid photographic exposure control system suitable for both flash and ambient illumination.

It is another primary object of this invention to provide an automatic exposure control system having a trim arrangement suitable for operation in both ambient and flash modes.

A still further object of this invention is to provide a hybrid exposure control system having a unitary trim arrangement.

SUMMARY OF THE INVENTION

In accordance with the general concept of the invention, the system includes an exposure control arrangement responsive solely to scene brightness in an ambient mode and to both scene brightness and anticipated scene illumination in a flash mode and a trim control for regulating both the photoresponsiveness and the scene ranging responsiveness of the system. In the illustrated embodiment, the system includes means operable in both ambient and flash operations for sensing the brightness of the scene and for determining a scene brightness parameter in a correspondence thereto, blade means actuatable to initiate an exposure interval and to define a plurality of aperture values located in an exposure path, means for controlling said blade means to terminate the exposure interval in accordance with the scene brightness parameter, means operative in a flash mode for regulating said blade means to select a maximum aperture in accordance with anticipated flash illumination of the scene, and means for altering the correspondence of said brightness parameter to scene brightness and for simultaneously altering the correspondence of the selected aperture value to the anticipated scene light level to provide trimming of the brightness sensing means for the ambient mode and the same trim for both the brightness sensing means and the scene ranging means in the flash mode.

BRIEF DESCRIPTION OF THE DRAWINGS

The novel features that are considered characteristic of the invention are set forth with particularity in the appended claims. The invention itself, however, both as to its organization and its method operation, together with additional objects and advantages thereof will best be understood from the following description of the preferred embodiment when read in connection with the accompanying drawings wherein like numbers have been employed in the different figures to denote the same parts and wherein:

FIG. 1 is a diagrammatic front elevational view of an exposure control system incorporating features of the instant invention, the view having portions broken away or removed to reveal internal structure;

FIG. 3 is a fragmentary top view of the follow-focus mechanism of the invention;

DETAILED DESCRIPTION OF THE DRAWINGS

Figure 2:
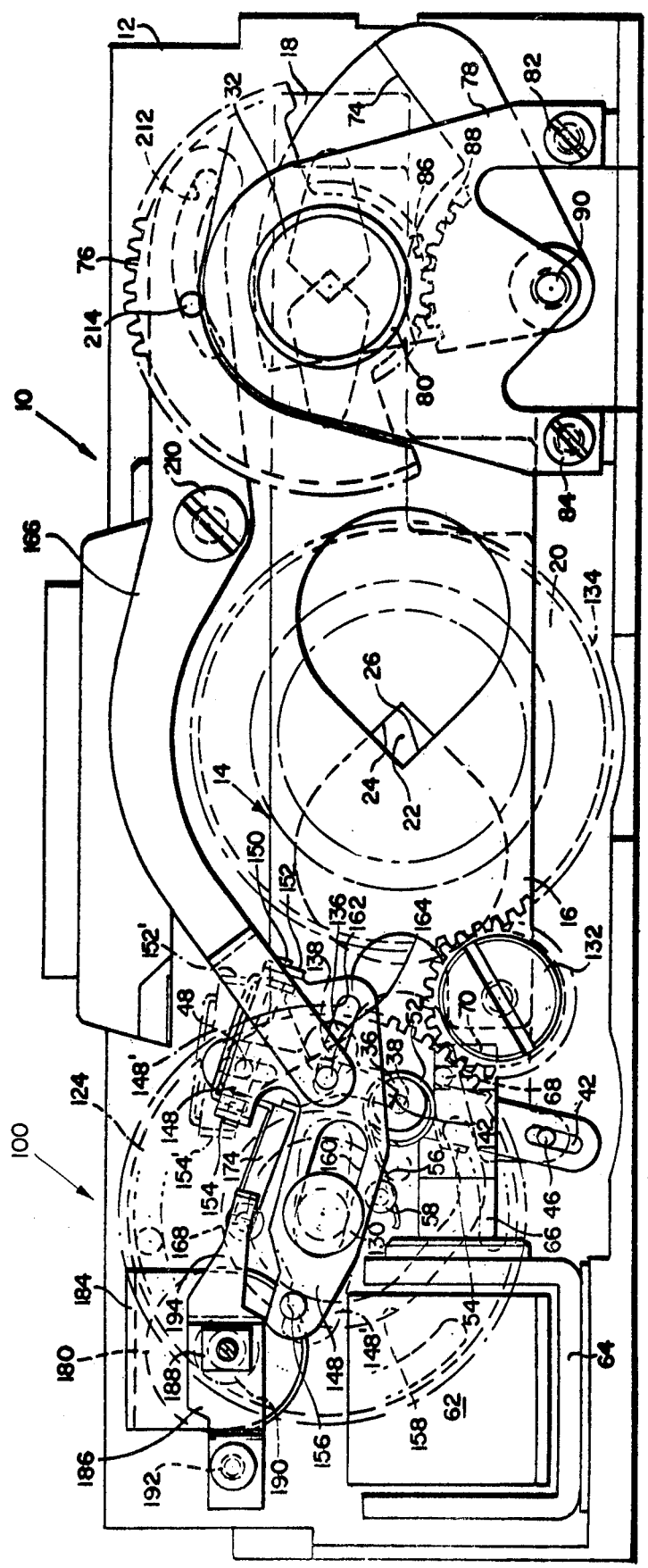
FIG. 2 is a front elevational view of the exposure mechanism of FIG. 1 showing the components thereof in an orientation defining aperture openings.

The apparatus and system of the present invention are ideally suited for incorporation within a fully automated single lens reflex camera having a reflexing mirror assembly normally retained in a viewing mode orientation. To derive adequate lighting for purposes of viewing and focusing, the exposure control arrangement maintains a full aperture opening as shown in FIG. 1 until a photographic cycle is commenced at which time the shutter is fully closed to secure its exposure chamber while the reflex arrangement is moved into its exposure orientation uncovering the exposure plane. An exposure is then made, after which the shutter is again held fully closed while the reflex assembly is returned to its initial viewing mode orientation and maximum aperture then re-established. A reflex photographic camera having components operating under the above cataloged program is described in detail in U.S. Pat. No. 3,672,281.

Referring to FIG. 1, the basic components of this sutter-aperture mechanism are revealed in detail as they are present within an exposure housing 10. Mounted upon a rear casting 12 of the housing 10, the exposure mechanism, shown generally at 14, is formed having two cooperatively moving shutter-diaphragm blades 16 and 18. Blades 16 and 18 slide horizontally along a given blade path within a mount (not shown) forming part of a lens housing 20 of an optical objective 22 defining the entrance of the optical path of the camera. Each of the blades, 16 and 18, is formed having a selectively shaped main opening, respectively depicted at 24 and 26, movable across the optical path of the camera at 22 to symmetrically overlap thereat and thereby define selectively varying, primary aperture values. Each blade, 16 and 18, additionally includes a corresponding photocell sweep opening, respectively depicted at 28 and 30, which move in correspondence with the respective main aperture openings 24 and 26 over the path of a photocell 32 to define secondary aperture values thereat. The photocell 32 is a photovoltaic cell forming an active element of a light integrating network 108 depicted in FIG. 5. A suitable light integrating network is described in U.S. Pat. No. 3,620,143.

Blades 16 and 18 define a continuous progression of apertures over both optical path 22 and the photocell 32 as a result of their mutual connection with a walking beam as shown at 34. Walking beam 34 is formed having a centrally disposed hub portion 36 which is journaled for rotation about an upstanding stud (not shown) fixed within and extending from rear casting 12. A pin 38 secures the hub portion 36 over the above-noted upstanding stud. Elongate slots, as at 42 and 44, are formed in the outward tip portions of beam 34 for the purpose of providing connection with pins 46 and 48 extending, respectively, from blades 16 and 18.

Beam 34 is biased for rotation in a manner tending to displace the blades 16 and 18 from a blocking position, wherein opening 24 and 26 are out of registration, toward a full open position by means of a spring 52, the central portion of which is wound about the pin 38. The movable end 54 of spring 52 being configured for biased contact against the beam 34, while its stationary end 56 is configured to abut against a pin 58 extending from rear casting 12. With spring 52 so connected, the exposure mechanism is biased for movement into a normally open orientation when in its relaxation mode of operation as illustrated in FIG. 1.

Movement of blades 16 and 18 from their normally open orientation into a closed orientation blocking the passage of light along the optical path of the camera 22 is carried out by an electromagnetic drive operative to provide a driven mode of operation. This electromagnetic drive is present as a solenoid 62 mounted upon rear casting 12 by bracket 64. Solenoid 62 is of somewhat conventional design, having an internally disposed cylindrical plunger 66 which retracts inwardly into its spiral winding and associated casing upon energization thereof. When solenoid 62 is so energized, walking beam 34 is rotated rapidly to move blades 16 and 18 into the closed orientation, not shown.

In the ambient mode, following conversion of the reflex camera to an exposure configuration which includes the energization of solenoid 62 to close shutter-aperture blades 16 and 18, the solenoid is de-energized to commence an exposure interval during which light rays pass along the optical path 22. Hence, with this de-energization, drive spring 52 moves blades 16 and 18 to progressively enlarge the aperture over optical path 22. Simultaneously, photocell sweep openings 28 and 30 define a corresponding progressively enlarging aperture opening over the photocell 32. When an appropriate amount of light is received by the photocell 32 to trigger a control circuit, solenoid 62 is again energized to rapidly close blades 16 and 18, thereby terminating an exposure interval. The latter energization of solenoid 62 continues until such a time as the reflex camera has reassumed its viewing and focusing mode orientation.

In the ambient operation thus described, relative aperture as well as exposure interval are selectively weighted for any given level of scene brightness so as to optimize the selection of exposure interval and aperture. To trim this ambient performance of the exposure system, an optical wedge 74, having selectively variable transmissive properties, is pivotally manipulated before the photocell 32. Adjustment of the position of wedge 74 is carried out by manually rotating a semi-circular trim wheel 76 from its uppermost serrated edge. Trim wheel 76 is rotatable by virtue of its journaled connection with a mounting plate 78 at annular opening 80. Mounting plate 78 is attached to rear casting 12 by screws as at 82 and 84. The lowermost portion of trim wheel 76 is formed having a gear segment 86 which is meshed with a corresponding gear segment 88 formed within the lower portion of wedge 74. Wedge 74 is pivotally mounted within the assembly upon a stud 90 extending from rear casting 12. Accordingly, rotation of wheel 76, in turn, selectively drives wedge 74 from its gear segment 88 through gear segment 86.

Manipulation of trim wheel 76 will selectively move optical wedge 74 across the photocell 32 to adjust the amount of light permitted to enter the light sensing network through cell sweep openings 28 and 30. A given trim orientation for the assembly is depicted in FIG. 2. Appropriate indicia may be positioned upon the housing 10 to aid the camera operator in inserting an appropriate amount of trim or exposure value adjustment.

In this application, by flash mode of operation is meant camera operation with a flashbulb or strobe unit in which scene illumination is achieved by means of an artificial source of known, limited intensity and duration of illumination. Hence, scene illumination from this source can be anticipated and will vary in accordance with the distance of the source from the scene.

Figure 4:
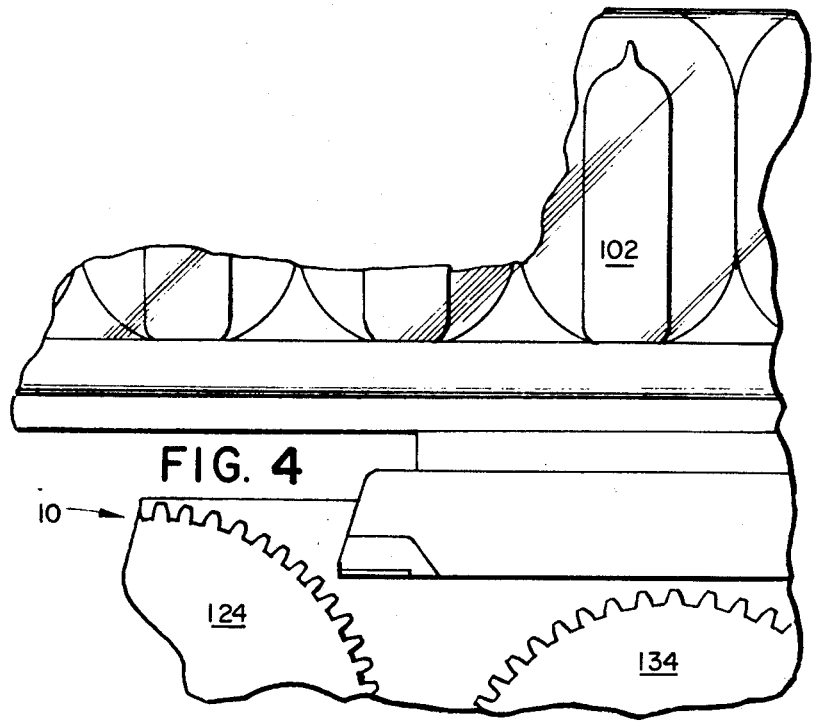
FIG. 4 is a fragmentary view of the system of FIG. 1 in combination with a flash array.

As later explained in more detail with regard to the overall operation of the exposure control system, a follow-focus mechanism 100, shown in detail in FIGS. 1 and 3, is employed in conjuction with the light unit 32 in the flash mode operation of the camera. As shown in these figures, a manually rotatable focus wheel 124 carries on its underside a cam track 158 within which a cam follower 156 is located. The cam follower 156 is mounted on an interceptor assembly 148 which extends from beneath the focus wheel 124 to a point where it may be utilized to engage and stop the travel of the walking beam 34. This follow-focus mechanism 100 is made effective only when a flash unit 102 is mounted on the mechanism 10 as shown in FIG. 4. Hence, as later explained in detail, the follow-focus mechanism is energized or, that is, rendered operative by means of a solenoid designated at 180. This follow-focus mechanism as explained below provides mechanical coupling between the focusing wheel 124 and the walking beam 34 so as to affect the aperture adjusting feature of the exposure mechanism in accordance with focusing of a lens assembly 134 and, hence, scene ranging or, that is, in accordance with the rotational position of the focus wheel. Hence, the follow-focus mechanism provides means for regulating the exposure blades to select a predetermined, specifically a maximum aperture value in accordance with scene ranging or, that is, in accordance with the anticipated level of flash illumination of the scene.

The follow-focus mechanism 100 will now be described in detail with regard to FIGS. 1 and 3 wherein the focus wheel 124 is shown mounted upon a pivot screw 126, extending through a focus wheel bushing 130 and is threadably connected to rear casting 12. Focus wheel 124 is formed having peripherally disposed gear teeth which are meshed with the teeth of an idler gear 132 which, in turn, is in driving connection with the external gear teeth of a cylindrical bezel assembly 134 retaining optical objective 22. Bezel 134 is rotatable from focus wheel 124 to provide objective lens focusing and, as may be apparent, the rotational orientation of focus wheel 124 continuously corresponds with the focus setting of the lens systems.

As indicated above, in the flash mode the movement of walking beam 34 along its path of travel establishing progressively enlarging apertures is selectively arrested to establish a maximum aperture value corresponding to focus distance or scene ranging. This motion arrest is provided generally by the interceptor assembly 148 which includes an interceptor component or arresting link 140 which is selectively positioned by the solenoid 180 within the abovenoted path of travel so as to intercept a striker pin 138 of the walking beam 34 to halt the exposure mechanism as it moves under the bias of spring 52. Hence, while rotation of the focus wheel 124 moves the cam track 158 with respect to the cam follower 156 so as to impart substantially rectilinear movement to the interceptor link 140 such that the position of the latter is, in turn, moved along the path of the walking beam pin 138, the relative positioning of link 140 in and out of the path of the striker pin 138 is provided by virtue of its hinged connection through tabs 144 and 146 and a threaded hinge pin 150 which is journaled for rotation between supporting tabs 152 and 154 of the assembly 148.

As can be seen in FIG. 1, the cam follower assembly 148 is formed having an elongate slot at 160 dimensioned to fit over the bushing 130 of the focus wheel 124. Restriction of rotation of the assembly 148 about the pivotal axis established by the bushing 130 is provided by a second elongate trim slot 62 which is engaged with a pin 164 of a trim link 166. As later explained in detail, the latter provides rotation of the interceptor assembly 148 in accordance with the aforementioned manipulation of the trim wheel 76.

As previously indicated the solenoid 180, shown more clearly in FIG. 3, is employed for enabling or actuating the follow-focus system and, more particularly, interceptor arresting link 140 which is biased to retract inwardly against the surface of the interceptor assembly 148 by means of a spring loaded plunger assembly 168. Assembly 168 includes an interceptor return pin 170 which is journaled for slideable movement within a bore formed within rear casting 12. Outward bias for assembly 168 is provided by a spiral spring 172 slidably wound about pin 170 and abuttably seated between the head thereof and rear casting 12. The head of pin 170 is positioned to abut against an extension 174 of interceptor arresting link 140, thereby urging the retraction of link 140 from its position engaging the exposure mechanism at pin 138.

Actuation of the follow-focus interceptor as described is provided by energization of the solenoid 180 which includes an internally disposed plunger 182. Solenoid 180 is mounted in stationary fashion upon rear casting 12 by a bracket 184. The outwardly extending tip of solenoid plunger 182 is connected to a pull-down bar 186 which includes an extended arm portion 194 arranged to slidably contact and abut against the outward surface of extension 174 of link 140. This abuttable contact is available throughout the focus and trim adjustment of the position of link 140.

When solenoid 180 is energized, its plunger 182 is retracted internally to, in turn, pivot pull-down bar 186 inwardly about its loose connection at rivet 192. This motion pivots link 140 about its hinged connection at pin 150 into the locus of travel of striker pin 138 against the bias of spring loaded plunger assembly 168. Conversely, de-energization of solenoid 180 permits plunger assembly 168 to return link 140 as well as pull-down bar 186 to their respective retracted positions against the inward face of focus wheel 124. The intercept orientation of link 140 and plunger assembly 168 are revealed in bold lines in FIG. 3, while their inactive position is revealed in dotted lines in the figure.

Figure 5:
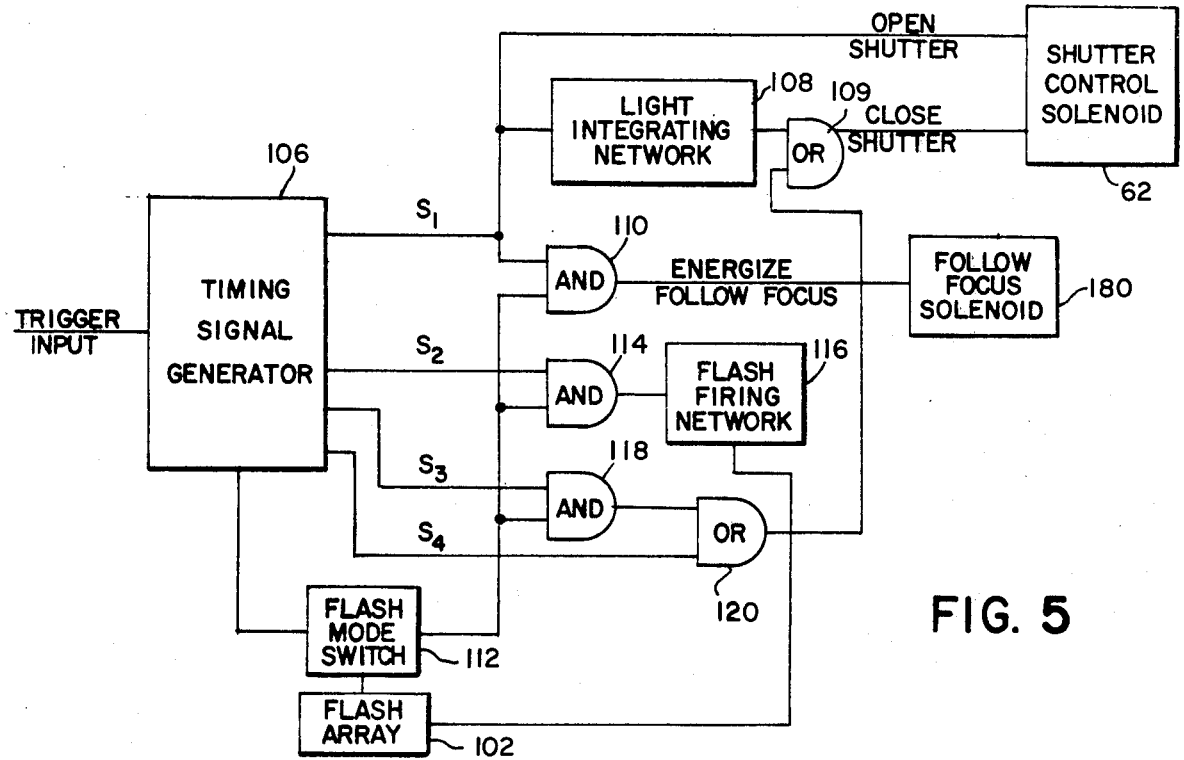
FIG. 5 is a block diagram showing the functional components and circuit interrelationships of a control system utilized in the mechanism shown in FIGS. 1 and 2.

Referring now to FIG. 5 wherein a typical exposure control system is shown in block diagram form, it should be noted that the system will employ a timing signal generator 106 or other sequencing means to which, following the preparation of the exposure chamber (not shown) to expose a film sheet (not shown), a trigger signal is delivered. This signal generator 106 then emits a first signal designated S1 which de-energizes shutter control solenoid 62 to open the shutter and simultaneously energizes the light integrating network 108 to begin evaluating scene lighting. Assuming ambient mode operation has been selected (when no flash array is in place) upon an appropriated amount of light being integrated or summed by the network 108, the latter energizes the shutter solenoid 62 by means of an "OR" gate 109 to close the shutter thereby defining the exposure interval. Flash mode selection is automatically provided by insertion of the flash array 102 which actuates a flash mode switch 112. The latter, in turn, provides a signal to "AND" gates 110, 114 and 118. As shown, the signal S1 is also delivered to the AND gate 110 so as to appropriately energize the follow-focus solenoid 180. This energization of the follow-focus solenoid 180 must take place just prior to or simultaneously with the initial start of opening of the shutter blades 16 and 18 so that once the follow-focus solenoid has been energized and the shutter then driven open, the selected maximum aperture will be defined by engagement of the walking beam pin 138 with the interceptor element 140. After an appropriate time to allow the blades to reach their selected aperture, the signal generator 106 then provides a second signal designated S2 which, through the "AND" gate 114, triggers the flash array 102 by means of a flash firing network 116. A suitable flash firing network is shown and described in U.S. Pat. No. 3,820,128.

As the flash fires, the light integrating network 108 will receive increased light energy which, under normal flash conditions, will provide an adequate output signal to close the shutter or, that is, to energize the control solenoid 62. Hence, it can be seen that while the follow-focus arrangement selects the maximum, and in effect the controlling aperture value since ambient light received at smaller apertures is low, the light integrating network controls or defines the exposure interval. This terminating of the exposure cycle by means of the light integrating network 108 should occur prior to any further signals being emitted by the timing signal generator. However, assuming the light energy of a given flash is unusually low or fails to fire such that the light integrating network 108 does not receive sufficient scene light to produce a shutter closing signal, within an appropriate period of time, the shutters are closed since the timing signal generator 106 produces a third signal designated at S3 which is timed to occur just following the completion of the flashing. This signal S3 is fed to the third "AND" gate 118 and then to "OR" gate 120 to close the shutter. Additionally, the timing signal generator 106 produces a final signal designated at S4, approximately 25 milliseconds after the origins of signal S1, which also is configured to close the shutter through "OR" gate 120 so as to provide a safety factor assuming the shutter mechanism has failed to receive either the signal from the light integrating network 108 or the S3 signal.

It should be noted that the timing signal generator 106 is configured to provide the signals S1-S4 automatically in either the ambient or the flash mode of operation. In the ambient mode of operation, however, since the flash mode switch 112 is not rendered on by plugging in the flash array 102, the S2 and S3 signals have no effect since their appropriate "AND" gates 114 and 118 do not receive a signal from the flash mode switch. Further, the follow-focus solenoid 180 could also not be energized by the S1 signal since its "AND" gate 110 also fails to receive a signal from the flash mode switch 112.

The components of the exposure mechanism providing a trim function for the follow-focus aperture control will now be described in detail with regard to FIG. 1. Trim information from trim wheel 76 is mechanically transmitted to the follow-focus components through the trim link 166. This link 166 is pivotally mounted upon rear casting 12 by a screw 210 extending into a stand-off (not shown). From this pivotal connection at 210, the link 166 is formed on one side having a curvature extending over the taking lens at 22 to terminate at a tip incorporating the earlier described pin 164. The opposite side of the trim link 166 is formed having an arcuately-shaped slot 212. Slot 212 is dimensioned to slideably fit over a camming pin 214 extending inwardly from the inner face of trim wheel 76. As trim wheel 76 is manually pivoted to provide trim adjustment of the photocell unit 32, the camming pin 214 is correspondingly moved about an arcuate path which varies vertically. Such movement of the pin 214, in turn, imparts a pivoting movement of trim link 166 about screw 210 which is, in turn, witnessed at pin 164 and serves to rotate interceptor assembly 148 about bushing 130. Accordingly, the resultant rotation of the interceptor assembly 148 causes the position of camming pin 156 to be selectively shifted in the cam groove 158 and, hence, the interceptor 140 to be advanced or retarded in its aperture defining position in accordance therewithin. Hence, both the photocell unit 32 and the follow-focus mechanism 100 can be adjusted or trimmed by any select exposure value through a simple manipulation of wheel 76.

A trim setting beyond the neutral position shown in FIG. 1 is illustrated in FIG. 2 wherein the neutral positions of the focus and trim apparatus are shown partially in phantom. A comparison of the trimmed, solid line representation of the components with the phantom representation of the components (shown having primed but identical numeration) illustrates that pin 156 has been advanced a select amount within cam 158.

As described earlier in connection with FIG. 1, movement of trim wheel 76 also serves to selectively position an optical wedge 74 over the light sensing element of an exposure control system. As a consequence, optical trim of the photocell input inserted by trim wheel 76 is simultaneously inserted into the follow-focus control system.

Trimming of the exposure system 10 in a direction to provide increased exposure is shown in FIG. 2 wherein the trim wheel 76 has been moved to the left. This positions the optical wedge 74 in front of the photocell unit 32 and rotates the interceptor 138 counterclockwise. The latter rotation, in turn, shifts the relationship between the interceptor 140 and the focus wheel. Hence, it should be undertsood that the trim arrangement including the wheel 76, the wedge 74 and the link 166 provide means for altering the correspondence of both the photosensitive unit 32 to scene brightness and the selected follow-focus aperture value to the anticipated scene light level.

Preferably, the trim arrangement is constructed so that substantially the same trim factor is applied to both the photoresponsive unit and to the follow-focus mechanism. That is, for example, the filter wedge 74 is designed to provide a maximum ± 1½ F stop variation in exposure value output of the photocell unit 32 in the ambient mode and a corresponding ± 1½ F stop variation in the follow-focus intercept position.

It should be noted, however, that when the light input to the photosensitive unit 32 is trimmed or altered by a given amount, for example by a factor designed to change the exposure value under given scene brightness conditions one F stop, the newly selected exposure value or, that is, the derived output parameter of the unit 32, in the ambient mode, controls both the effective aperture achieved and the exposure interval whereas in the flash mode, the follow-focus mechanism determines the effective aperture. This application of the single trim factor for both control elements is achieved by virtue of the fact that the photocell input is also in tracking relation to the main exposure diaphragm. Hence, while the photocell unit 32 does not define the effective diaphragm aperture value in the flash mode, it will by virtue of the tracking secondary photocell aperture define, in any case, a suitable exposure interval consistent with the selected aperture value. Stated otherwise, the photocell unit 32 is designed to provide an appropriate exposure interval for any selected main aperture value.

Since certain changes may be made in the above-described system and apparatus without departing from the scope of the invention herein involved, it is intended that all matter contained in the description thereof or shown in the accompanying drawings shall be interpreted as illustrative and not in a limiting sense.

What is claimed is:

1. A photographic control system for a camera, said camera having means for mounting photographic film material at a given focal plane so as to receive image-carrying rays transmitted along a given optical path from the scene to be photographed, and means for providing flash illumination and for determining the anticipated level of flash brightness of the scene expected from said flash illumination, said system comprising:

means actuatable for unblocking and blocking said optical path and for defining a plurality of aperture values in operative relation to said optical path;

means for cooperating with said unblocking and blocking means to establish operable aperture values in correspondence with anticipated levels of flash scene brightness determined by said determining means;

energizeable means for defining exposure time intervals in correspondence with varying levels of actual scene brightness experienced during flash exposure operations;

means when coupled to a source of power for actuating said unblocking and blocking means to unblock said optical path thereby initiating an exposure interval during which scene light is transmitted to said film plane and, in response to said exposure time interval defining means, to again block said optical path to thereby terminate said exposure interval; and selectively operative means for adjusting by substantially the same trim factor both said correspondence between said anticipated level of flash scene brightness determined by said determining means and said operable aperture values and said correspondence between said varying levels of actual scene brightness experienced during exposure operations and said exposure time intervals so that said system operates under substantially the same trim influence provided by said adjustment of the correspondence of both said operable aperture values and said exposure time intervals.

2. The system of claim 1 wherein said correspondence between said anticipated level of flash scene brightness and between said levels of actual scene brightness are predetermined in accordance with a given exposure value, and said adjusting means includes means for adjusting said correspondence by a trim factor substantially equal to a desired change in exposure value.

3. The system of claim 1 wherein said interval defining means includes means for sensing the brightness of the scene, and said unblocking and blocking means includes means actuatable for blocking and unblocking said brightness sensing means and for defining a plurality of secondary apertures in operative relation thereto, said secondary apertures being in tracking relation to said aperture values defined in operative relation to said optical path.

4. The system of claim 1 wherein said interval defining means includes means for sensing the brightness of said scene and for defining an interval in relation to the total brightness sensed thereby, said unblocking and blocking means includes a blade mechanism displaceable between a first position in blocking relation to both said optical path and said sensing means and a second position in unblocking relation to both said optical path and said sensing means, said blade mechanism defining progressively enlarging aperture values in operative relation to both said optical path and said sensing means as said blade mechanism is displaced to said second position, and said means for cooperating with said unblocking and blocking means includes means for cooperating with said blade mechanism to establish a primary aperture value in operative relation with said optical path and a secondary aperture value in operative relation to said sensing means in accordance with camera to subject distance.

5. A photographic control system for a camera, said camera having means for mounting photographic film material at a given focal plane so as to receive image-carrying rays transmitted along a given optical path from the scene to be photographed, and selectively operative means for selecting ambient or flash mode operation and operative in the flash mode for providing flash illumination and for determining the anticipated level of flash brightness of the scene expected from said flash illumination, said system comprising:

means actuatable for unblocking and blocking said optical path and for defining progressively changing aperture values in operative relation to said optical path during said unblocking actuation;

means operable only during said flash mode operation for cooperating with said unblocking and blocking means to establish operable aperture values in correspondence with anticipated levels of flash scene brightness determined by said determining means;

energizeable means operable during both said ambient and said flash mode operations for defining exposure time intervals in correspondence with varying levels of actual scene brightness experienced during exposure operations;

means when coupled to a source of power for actuating said unblocking and blocking means during both ambient and flash mode operation to unblock said optical path thereby initiating an exposure interval during which scene light is transmitted to said film plane and, in response to said exposure time interval defining means, to again block said optical path to thereby terminate said exposure interval; and selectively operative means for adjusting said correspondence between said anticipated level of flash scene brightness determined by said determining means and said operable aperture values, and between said varying levels of actual scene brightness experienced during exposure operations and said exposure time intervals so that said system operates in said flash mode under the trim influence provided by said adjustment of the correspondence of both said operable aperture values and said exposure time intervals while said system operates in said ambient mode under the trim influence provided solely by said adjustment of the correspondence of said exposure time intervals.

6. The system of claim 5 wherein said exposure time interval defining means includes a photosensitive element, and said unblocking and blocking means includes means for controlling the input to said photosensitive element in substantially tracking relation to said aperture values.

7. The system of claim 5 wherein said interval defining means includes means for sensing the brightness of the scene, and said unblocking and blocking means includes means actuatable for blocking and unblocking said brightness sensing means and for defining a plurality of secondary apertures in operative relation thereto, said secondary apertures being in tracking relation to said aperture values defined in operative relation to said optical path.

8. The system of claim 5 wherein said interval defining means includes means for sensing the brightness of said scene and for defining an interval in relation to the total brightness sensed thereby, said unblocking and blocking means includes a blade mechanism displaceable between a first position in blocking relation to both said optical path and said sensing means and a second position in unblocking relation to both said optical path and said sensing means, said blade mechanism defining progressively enlarging aperture values in operative relation to both said optical path and said sensing means as said blade mechanism is displaced to said second position, and said means for cooperating with said unblocking and blocking means includes means for cooperating with said blade mechanism to establish a primary aperture value in operative relation with said optical path and a secondary aperture value in operative relation to said sensing means in accordance with camera to subject distance.

9. The system of claim 5 wherein said interval defining means includes means for sensing the brightness of the scene, and said cooperating means includes means for establishing operable aperture values substantially in accordance with camera-to-subject distance, and said adjusting means includes means for adjusting the correspondence between said operable aperture values and said camera-to-subject distance.

10. The system of claim 9 wherein said adjusting means includes means for simultaneously adjusting the amount of light rays passing from said scene to said sensing means.

11. The system of claim 5 wherein said adjusting means includes means for adjusting said correspondence between said anticipated level of flash brightness and said operable aperture values and said correspondence between said varying levels of actual scene brightness and said exposure time intervals by substantially the same trim factor.

12. A method of operating a camera having an automatic exposure control system, said method comprising the steps of:
 operating said automatic exposure control system to determine an exposure program during ambient mode operation as a given function of the quantity of scene light actually detected;
 operating said automatic exposure control system to determine an exposure program during flash mode operation as a given function of both the distance the subject is positioned from the camera and the quantity of scene light actually detected; and
 adjusting by a given trim factor the functional relationship of said exposure control system to both said detected scene light and said subject to camera distance such that said system provides in ambient operation an exposure program altered in accordance with said trim factor as applied to said system relation to said detected light and in flash operation an exposure program altered in accordance with said trim factor as applied to said system relation to both said detected light and to said subject to camera distance.

13. The method of claim 12 wherein said adjusting step includes adjusting the functional relationship of said system to both said detected scene light and said subject-to-camera distance by substantially the same trim factor.

* * * * *